(12) United States Patent
Marinus et al.

(10) Patent No.: US 10,465,897 B2
(45) Date of Patent: Nov. 5, 2019

(54) LIGHTING DEVICE WITH CONNECTOR FOR ADD ON ELECTRICAL DEVICE

(71) Applicant: SIGNIFY HOLDING B.V., Eindhoven (NL)

(72) Inventors: Antonius Adrianus Maria Marinus, Eindhoven (NL); Vincent Stefan David Gielen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/770,286

(22) PCT Filed: Oct. 4, 2016

(86) PCT No.: PCT/EP2016/073657
§ 371 (c)(1),
(2) Date: Apr. 23, 2018

(87) PCT Pub. No.: WO2017/071917
PCT Pub. Date: May 4, 2017

(65) Prior Publication Data
US 2018/0313526 A1 Nov. 1, 2018

(30) Foreign Application Priority Data
Oct. 26, 2015 (EP) .................................... 15191371

(51) Int. Cl.
*F21V 29/70* (2015.01)
*F21V 8/00* (2006.01)
(Continued)

(52) U.S. Cl.
CPC .............. *F21V 29/70* (2015.01); *F21K 9/232* (2016.08); *F21K 9/61* (2016.08); *F21V 23/045* (2013.01);
(Continued)

(58) Field of Classification Search
CPC ........ F21V 29/70; F21V 29/89; F21V 23/045; F21V 23/06; F21K 9/61; F21K 9/232; G02B 6/0021
See application file for complete search history.

(56) References Cited

U.S. PATENT DOCUMENTS 8,948,564 B1 * 2/2015 Sherman .................. F21K 9/61
362/335
2003/0117803 A1 6/2003 Chen
(Continued)

FOREIGN PATENT DOCUMENTS

CN 203115617 U 8/2013
DE 102009019881 A1 11/2010
(Continued)

*Primary Examiner* — Anabel Ton
(74) *Attorney, Agent, or Firm* — Stephen M. Kohen

(57) ABSTRACT

A lighting device (100, 600) comprises a first portion (110, 610), a solid state light source (120, 620), a second portion (130, 630), a metal heat sink (140, 640-641) and a connector (150). The first portion is arranged for electrically connecting the lighting device. The second portion is mounted on the first portion and has an outer surface, wherein at least a portion (131, 631) of the outer surface is light transmissive for outputting light originating from the solid state light source. The metal heat sink extends along the outer surface, and is arranged in thermal contact with the solid state light source. The connector is arranged at the metal heat sink for connecting an electrical device (160, 660). A distance (D1, D3, D4) from the first portion to the connector is longer than a distance (D5) from the first portion to at least one light transmissive portion (131, 631) of the outer surface.

20 Claims, 5 Drawing Sheets

(51) Int. Cl.
  *F21V 23/06* (2006.01)
  *F21V 29/89* (2015.01)
  *F21K 9/232* (2016.01)
  *F21K 9/61* (2016.01)
  *F21V 23/04* (2006.01)
  *F21Y 101/00* (2016.01)
  *F21Y 115/10* (2016.01)

(52) U.S. Cl.
  CPC .............. *F21V 23/06* (2013.01); *F21V 29/89* (2015.01); *G02B 6/0021* (2013.01); *F21V 23/0435* (2013.01); *F21V 23/0442* (2013.01); *F21Y 2101/00* (2013.01); *F21Y 2115/10* (2016.08)

(56) References Cited

U.S. PATENT DOCUMENTS

| | | | |
|---|---|---|---|
| 2010/0118148 A1 | 5/2010 | Lee | |
| 2010/0302770 A1* | 12/2010 | Lee | F21K 9/00 362/218 |
| 2012/0306377 A1 | 12/2012 | Igaki et al. | |
| 2013/0235586 A1 | 9/2013 | Gielen et al. | |
| 2014/0119034 A1 | 5/2014 | Chen et al. | |
| 2014/0133154 A1 | 5/2014 | Ju et al. | |
| 2014/0268833 A1 | 9/2014 | Ju et al. | |
| 2014/0273892 A1* | 9/2014 | Nourbakhsh | H04B 1/3827 455/90.3 |
| 2015/0289349 A1 | 10/2015 | Kim | |
| 2016/0018092 A1* | 1/2016 | Knaapen | F21S 2/005 362/235 |
| 2016/0097490 A1* | 4/2016 | Marinus | F21V 3/06 362/249.01 |

FOREIGN PATENT DOCUMENTS

| | | |
|---|---|---|
| JP | 2010114055 A | 5/2010 |
| JP | 2012248307 A | 12/2012 |
| JP | 2012252817 A | 12/2012 |
| KR | 20130097851 A | 9/2013 |
| WO | WO2006014069 A1 | 2/2006 |
| WO | WO2010080565 A1 | 7/2010 |

* cited by examiner

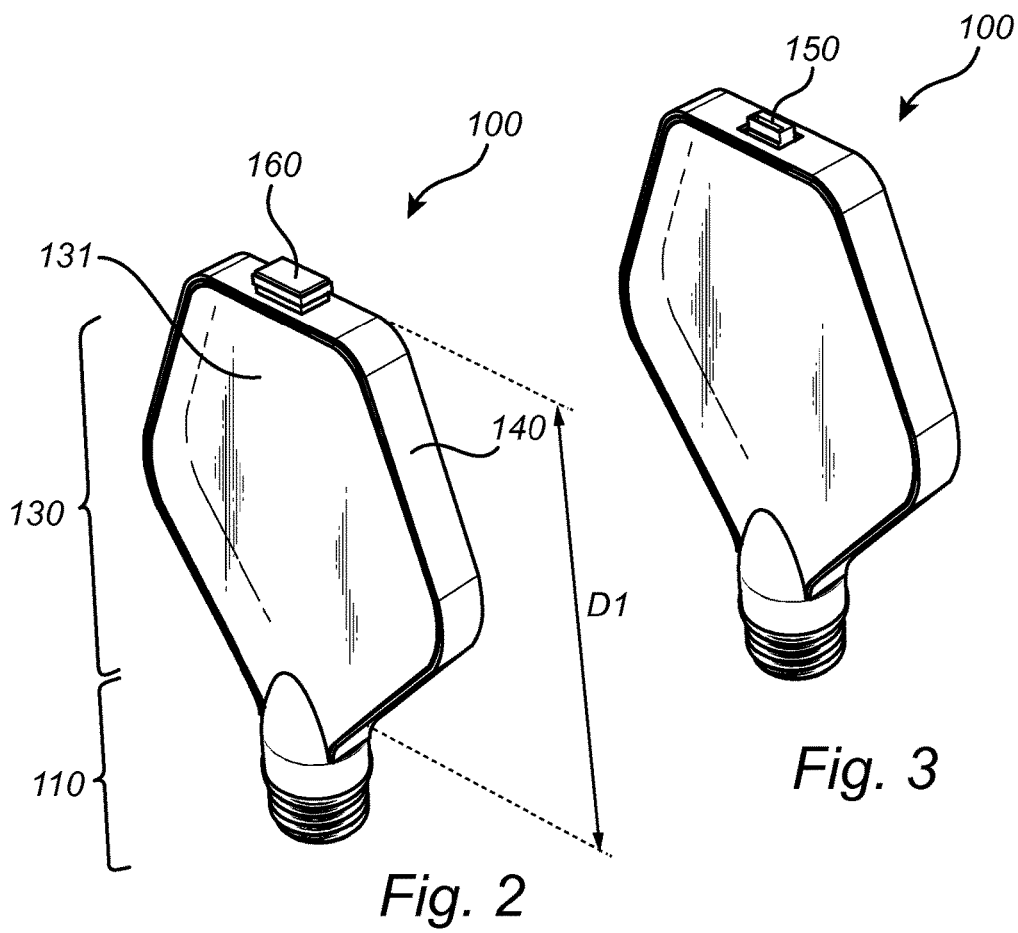
Fig. 2
Fig. 3
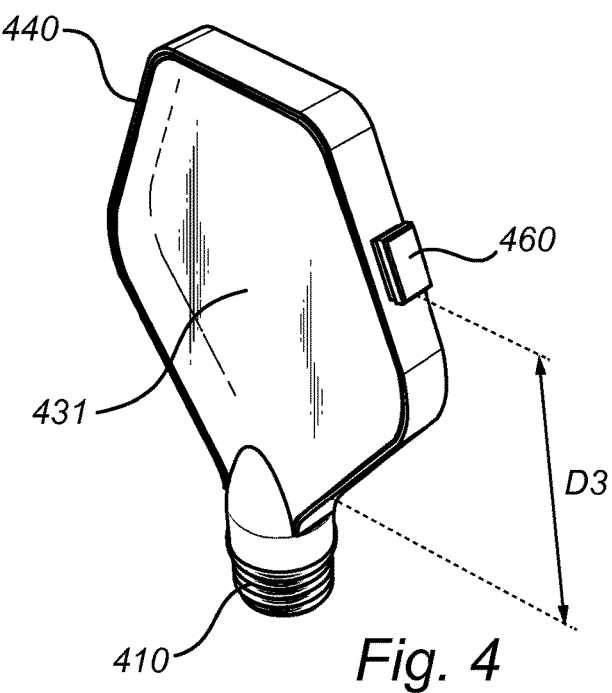
Fig. 4

LIGHTING DEVICE WITH CONNECTOR FOR ADD ON ELECTRICAL DEVICE

CROSS-REFERENCE TO PRIOR APPLICATIONS

This application is the U.S. National Phase application under 35 U.S.C. § 371 of International Application No. PCT/EP2016/073657, filed on Oct. 4, 2016, which claims the benefit of European Patent Application No. 15191371.2, filed on Oct. 26, 2015. These applications are hereby incorporated by reference herein.

FIELD OF THE INVENTION

The present invention generally relates to the field of lighting devices, and in particular to the field of lighting devices comprising solid state light sources.

BACKGROUND OF THE INVENTION

Replacement of traditional light sources, such as incandescent light bulbs, by solid state light sources, such as light emitting diodes (LEDs), is often associated with a number of issues. For example, the light output provided by a LED typically has a different spectral composition than the light output of a traditional light source, for example based on an incandescent filament. Further, the spatial intensity distribution of the light output of a LED is typically different than the spatial intensity distribution of the light output provided by a traditional light source. Moreover, heat generated during operation of the LEDs may damage or deteriorate performance of the LEDs. Therefore, design of LED-based lighting devices typically involves considerations relating to heat management.

WO 2010/080565A1 discloses a retrofit LED light bulb with additional features such as a backup battery, a camera, a detector/sensor, an audio device, a communication device, a camera, and/or a repeater. As LEDs are substantially smaller than incandescent and fluorescent light bulbs, there is space available in the LED light bulb for housing such extra features. The additional features are arranged within a shell behind the LEDs together with circuitry for converting line voltage into voltage suitable for the LEDs.

The positioning of the extra features within the shell behind the LEDs may prevent optimal performance or operation of at least some of the extra features since input to the extra features from the surrounding environment, and/or output from the extra features to the surrounding environment, may be obstructed by the shell and the LEDs. It would be advantageous to provide alternative lighting devices which allow improved performance for at least one such additional feature without adversely affecting the optical performance of the lighting device.

SUMMARY OF THE INVENTION

It would be advantageous to achieve a lighting device addressing one or more of the above mentioned issues. In particular, it would be desirable to obtain improved performance or operation of an electrical device integrated in a lighting device (for providing the lighting device with an additional functionality) without adversely affecting, or at least adversely affecting less than prior art devices, the optical performance of the lighting device.

To better address one or more of these issues, a lighting device having the features defined in the independent claim is provided. Preferable embodiments are defined in the dependent claims.

Hence, according to some embodiments, a lighting device is provided. The lighting device comprises a first portion, a solid state light source, a second portion, a metal heat sink, and a connector. The first portion is arranged for electrically connecting the lighting device. The second portion is mounted on the first portion. The second portion has an outer surface, wherein at least a portion of the outer surface is light transmissive for outputting light originating from the solid state light source. The metal heat sink extends along the outer surface. The metal heat sink is arranged in thermal contact with the solid state light source. The connector is arranged at the metal heat sink for connecting an electrical device. A distance from the first portion to the connector is longer than a distance from the first portion to at least one light transmissive portion of the outer surface.

It will be appreciated that if a light transmissive portion of the outer surface is arranged in direct contact with the first portion, then the connector may be arranged at a positive (non-zero) distance from the first portion.

As the metal heat sink is arranged in thermal contact with the solid state light source and extends along the outer surface, heat generated by the solid state light source may be efficiently dissipated to the surroundings/ambient (e.g. air or a gas/material surrounding the lighting device). Cooling of the solid state light source is therefore facilitated.

The connector provides a way to connect an electrical device at the metal heat sink. A new functionality/ability may be provided to (or bestowed upon) the lighting device by connecting an electrical device (e.g. a sensor/detector, a camera or a microphone) at the metal heat sink.

Connection of the electrical device at the metal heat sink, which extends along the outer surface of the second portion, facilitates interaction of the electrical device with the surroundings (e.g. ambient air or objects in a room in which the lighting device is arranged), which in turn improves the operating conditions of (and/or the result obtained by) the electrical device.

Connection of the electrical device at the metal heat sink may also reduce the impact of the electrical device on the light output (or optical performance) of the lighting device. Indeed, providing an electrical device at the metal heat sink will not affect the light output of the lighting device much further as the metal heat sink is already arranged along the outer surface of the second portion for improving thermal management. For example, part of the electrical device may be hidden behind, or may overlap, the metal heat sink, so that little or no light (originating from the solid state light source) not already obstructed by the metal heat sink will be obstructed/shadowed by the electrical device when the electrical device is connected at the metal heat sink.

Thanks to the arrangement of the metal heat sink along the outer surface (covering only part of the outer surface, e.g. covering a strip of the outer surface), the metal heat sink can be used for thermal management (dissipating heat generated by the solid state light source) and for electrical connection/mounting of the electrical device (or add-on device). Using the metal heat sink for both functions is advantageous as this does not require the arrangement of additional elements which may potentially affect the light output of the lighting device. Further, in at least some embodiments, electrical connections (for example wires) for providing power to the electrical device (for example from an electrical interface of the first portion) may be hidden by the metal heat sink.

The distance from the first portion to the connector being longer than a distance from the first portion to at least one light transmissive portion of the outer surface means that the first portion is closer to a light transmissive portion than to the connector. Allowing at least some light to exit the second portion close to the first portion, at which the second portion is mounted, facilitates provision of a more omnidirectional light output.

Increasing the distance from the first portion to the connector may also allow the electrical device to be mounted at an increased distance from the first portion. Such an increased distance may facilitate interaction of the electrical device with the surroundings (e.g. ambient air or objects in a room in which the lighting device is arranged), which may improve operating conditions (and/or the result obtained by) the electrical device.

The distances may for example be measured in a direction along an axis extending through a center of the lighting device, from a central end of the first portion to a central end of the second portion located opposite to an end of the second portion at which the second portion is mounted at the first portion.

The first portion (or base) may for example be adapted for mounting the lighting device in (or attaching the lighting device to) a socket.

The first portion may for example comprise a screw type cap (e.g. E14, E27), a bayonet type cap (e.g. B22d, Ba15d), or another type of cap, such as G4 or GU10.

The lighting device may for example be a retrofit lighting device in the sense that it may be adapted for replacing more traditional lighting devices such as incandescent light bulbs or halogen lamps, e.g. by having a cap adapted for mounting the lighting device in a socket employed for such more traditional lighting devices (e.g. E14, E27, B22d, Ba15d, G4, GU10).

The first portion may for example be adapted for mounting the lighting device at (or attaching the lighting device to) a dedicated position in a lamp, luminaire or lighting arrangement.

The first portion may for example comprise an electrical interface for connecting the lighting device to an electric power supply when the lighting device is mounted. The electrical interface may for example be in electrical contact with the solid state light source.

The first portion may for example include an AC/DC converter.

The connector may for example be adapted for mounting the electrical device at the metal heat sink, e.g. at a side of the metal heat sink facing away from the second portion and/or facing away from the solid state light source.

The connector may for example include a protruding portion and/or an opening. The electrical device may for example be mounted at the metal heat sink by inserting part of the electrical device into the opening of the connector.

The electrical interface of the connector may for example be arranged for providing power to the electrical device.

According to some embodiments, the metal heat sink may extend along a strip of the outer surface, and portions of the outer surface on both sides of the strip may be light transmissive for outputting light originating from the solid state light source. Having light transmissive portions on both sides of the strip along which the metal heat sink extends allows light to exit the second portion on both sides of the metal heat sink, which facilitates provision of a more omnidirectional light output. The light transmissive portions located on both sides of the strip may for example be wider than the strip for facilitating provision of a more omnidirectional light output.

The light transmissive portions (of the outer surface) located on both sides of the strip may for example be parallel to the strip, i.e. the light transmissive portions may face in the same direction as the strip.

The light transmissive portions (of the outer surface) located on both sides of the strip may for example be portions of the outer surface facing in different directions than the strip. For example, the light guide may have two main surfaces and an edge joining the two main surfaces. The edge may constitute the strip along which the metal heat sink extends and the main surfaces may constitute the light transmissive portions on both sides of the strip.

The light transmissive portions (of the outer surface) located on both sides of the strip may for example be arranged at an angle relative to the strip. The light transmissive portions (of the outer surface) located on both sides of the strip may for example be perpendicular to the strip.

According to some embodiments, the connector may be arranged at an end of the second portion located opposite to an end of the second portion at which the second portion is mounted on the first portion. Arrangement of the connector at the end located opposite to the first portion allows for connecting (or mounting) the electrical device at an increased distance from the first portion.

According to some embodiments, the lighting device may further comprise an electrical device mounted (and/or connected), via the connector, at the metal heat sink. The electrical device may for example be connected to an electrical interface of the connector.

According to some embodiments, the electrical device may comprise a sensor or an output device or both a sensor and an output device. The output device may be arranged (or configured) to provide an output signal to surroundings of the lighting device. The output device may for example be arranged to provide the (e.g. optical or acoustic) output signal through air or gas surrounding the lighting device.

The sensor may for example be arranged to provide an (e.g. electrical) input signal to the lighting device in response to stimulus from surroundings of the lighting device.

The sensor may for example be a microphone, a camera, a presence detector, a smoke detector, or an air quality sensor.

The output device may for example be a signal LED, or a loudspeaker.

According to some embodiments, the second portion of the lighting device may comprise a body and the metal heat sink may comprise a metal strip extending along an outer surface of the body. The first portion may include an electrical interface. The lighting device may further comprise an electrical connection between the electrical interface of the first portion and an electrical interface of the connector. The electrical connection may be arranged at least partly between the metal strip and the body.

At least partly hiding the electrical connection between the metal strip and the body may protect the electrical connection from wear or unintended physical interaction, and/or may reduce its impact on the light output of the lighting device.

The body may for example be solid (e.g. a light guide such as a solid piece of glass or polymer material, for example polymethyl methacrylate, PMMA) or hollow (e.g. an envelope with a cavity or open volume inside).

The electrical interface of the first portion may for example be arranged for connecting the electrical device to a power source.

According to some embodiments, the second portion of the lighting device may comprise a light guide and the metal heat sink may comprise a metal strip extending at least partly around the light guide along a surface of the light guide. The metal strip may be arranged in thermal contact with the surface of the light guide. The solid state light source may be arranged to emit light into the light guide. The connector may be arranged at the metal strip.

The light guide may be employed both for increasing a light emitting area of the lighting device and for dissipating heat from the lighting device. In the present embodiments, light emitted by the solid state light source propagates within the light guide (e.g. including one or more total internal reflections within the light guide) before exiting the light guide. The light guide provides a larger light emitting area than the light emitting area of a (single) solid state light source and increases the light emitting area of the lighting device. Whether a given light ray is able to exit the light guide at a particular location (e.g., instead of being reflected within the light guide) may for example depend on a surface structure of the light guide at that location and/or an angle of the light ray relative to a surface of the light guide at that location.

The thermal contact between the solid state light source and the metal strip allows heat to be transferred from the solid state light source to the metal strip. The thermal contact, in the present embodiments, between the metal strip and the surface of the light guide allows heat to be transferred from the metal strip to the light guide from which the heat may be dissipated to the surroundings. As the metal strip extends at least partly around the light guide, heat from the solid state light source may be more efficiently transferred via the metal strip to the light guide. The arrangement of the metal strip at least partly around the light guide therefore improves heat management of the lighting device.

Use of the light guide to dissipate heat from the light guide reduces the need for additional heat sinks which could otherwise reduce the light emitting area of the lighting device and/or obstruct light emitted by the solid state light source.

The light guide may for example be at least partially light transmissive, such as transparent or translucent.

The light guide may for example comprise transparent or translucent parts/portions.

The light guide may for example be thermally conductive.

The light guide may for example comprise thermally conductive parts/portions.

According to some embodiments, the light guide may have at least two main surfaces and an edge joining the two main surfaces. The metal strip may extend along the edge.

The main surfaces may provide a major part/portion of the light output from the lighting device. Arranging the metal strip to extend along the edge of the light guide (rather than along the main surfaces) may reduce an amount of light obscured/obstructed or shadowed by the metal strip. Reducing the amount of light obscured or shadowed by the metal strip may provide a more omnidirectional light output.

The light guide may for example allow at least some light emitted by the solid state light source to propagate between the main surfaces and/or the edge (e.g., including one or more reflections within the light guide) before being emitted from the light guide (e.g., from the main surfaces and/or the edge).

The light guide may for example be a plate having two main surfaces (e.g., extending in substantially parallel planes) and an edge.

The edge may for example be normal to a plane along which (main surfaces of) the light guide extends.

According to some embodiments, the light guide may extend at least four times more in a direction along a plane than along a normal to the plane. In other words, the light guide may have a flat shape in the sense that it may extend a distance along a plane which is at least four times as long as a distance covered by the light guide along a direction normal (or perpendicular) to the plane. In at least some embodiments where the metal strip extends along an edge of the light guide (rather than along a main surface of the light guide), this flat shape of the light guide may reduce an amount of light obscured or shadowed by the metal strip.

A length or diameter of the light guide may for example be at least four times a thickness of the light guide.

According to some embodiments, the metal strip may extend at least two-third of a full revolution around the light guide, or the lighting device may comprise at least two metal strips together extending at least two-third of a full revolution around the light guide. By one or more metal strips extending at least two-third of a revolution around the light guide is meant that the metal strip(s) extends such that it covers at least an angle of 240 degrees out of a total of 360 degrees around the light guide. The metal strip may for example extend (or the metal strips may for example together extend) at least halfway around the light guide, i.e. the metal strip(s) may extend such that it covers at least half a revolution around the light guide, or in other words, at least an angle of 180 degrees out of a total of 360 degrees around the light guide. Increasing the length of the metal strip along the light guide may facilitate transfer of heat from the metal strip to the light guide.

The at least two metal strips together extending at least two-third (or half) of a full revolution around the light guide may for example both be in thermal contact with a solid state light source arranged to emit light into the light guide.

According to some embodiments, the solid state light source may be arranged between the light guide and the metal strip.

The solid state light source may for example be arranged adjacent to the light guide and/or to the metal strip.

The solid state light source may for example be arranged in thermal contact with both the light guide and the metal strip.

The solid state light source may for example be arranged to face the surface or edge of the light guide along which the metal strip is arranged.

According to some embodiments, the second portion may be a bulb and the solid state light source may be arranged within the bulb. "Bulb" is to be understood to include a variety of possible shapes, such as a rounded spherical shape, a tube-like (or cylindrical) shape, or a polyhedron shape (e.g. a dodecahedron, octahedron, or hexahedron). The bulb may also be referred to as an envelope at least partially enclosing a volume in which the solid state light source is arranged.

According to some embodiments, the metal heat sink may extend from inside the bulb into the outer surface of the bulb (and thereby form part of the outer surface of the bulb), for further improving the cooling capacity of the lighting device. In other words, the outer surface of the bulb does not need to be a closed surface but may be formed by distinguishable parts that, for example, are flush at the outer surface of the bulb.

According to some embodiments, the lighting device may comprise a cluster of solid state light sources (e.g. light emitting diodes) which is distributed in subgroups of solid state light sources by the metal heat sink. Distributing the solid state light sources in such a way may further improve cooling efficiency of the lighting device as at least part of the metal heat sink is then arranged between at least some of the solid state light sources.

According to some embodiments, the lighting device may further comprise a conversion unit for converting signals between a signal format employed by the electrical device and a signal format transmittable over a power line to which the first portion is connectable. The conversion unit may for example be arranged at (or in) the first portion.

It is noted that embodiments of the invention relates to all possible combinations of features recited in the claims and the above mentioned embodiments.

BRIEF DESCRIPTION OF THE DRAWINGS

This and other aspects will now be described in more detail with reference to the appended drawings showing a number of embodiments.

FIG. 2 shows a perspective view of the lighting device shown FIG. 1, in assembled form.

FIG. 3 shows a perspective view of a lighting device with a connector for mounting an electrical device, according to an embodiment.

FIG. 4 shows a perspective view of a lighting device according to an embodiment.

All the figures are schematic, not necessarily to scale, and generally only show parts which are necessary in order to elucidate the embodiments, wherein other parts may be omitted or merely suggested.

DETAILED DESCRIPTION

The present invention will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and for fully conveying the scope of the present disclosure to the skilled person.

Figure 1:
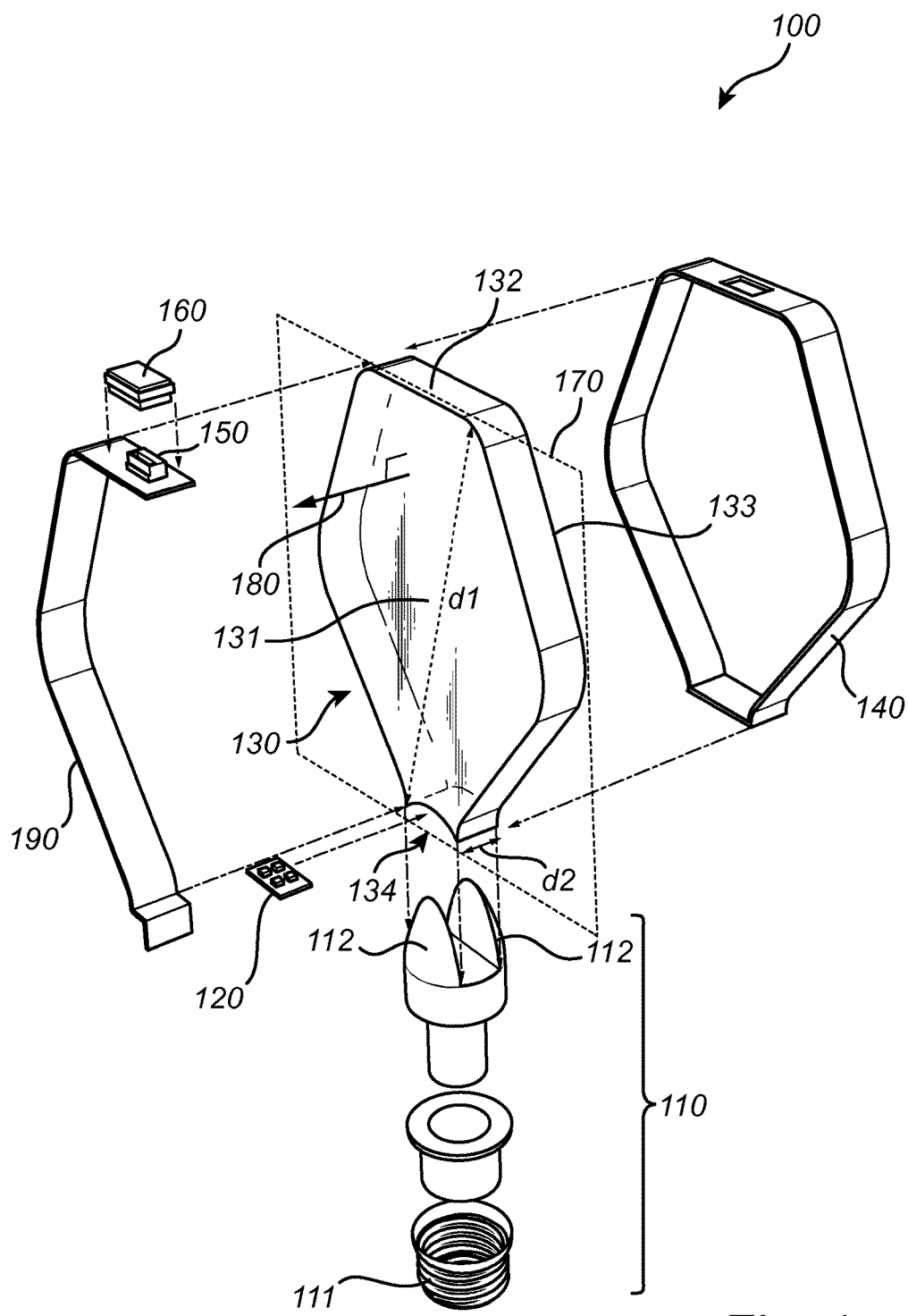
FIG. 1 shows an exploded view of a lighting device with a light guide according to an embodiment.

FIG. 1 shows an exploded view of a lighting device 100 according to an embodiment. FIG. 2 shows the lighting device 100 in assembled form. The lighting device 100 comprises a first portion 110, a solid state light source 120, a second portion 130, a metal heat sink 140, and a connector 150. The first portion 110 is arranged to electrically connect the lighting device 100. The second portion 130 is mounted on the first portion 110. The second portion 130 has an outer surface. At least a portion 131 of the outer surface is light transmissive for outputting light originating from the solid state light source 120. The metal heat sink 140 extends along the outer surface. The metal heat sink 140 is arranged in thermal contact with the solid state light source 120. The connector 150 is arranged at the metal heat sink 140 for connecting an electrical device 160 (or add-on device 160). A distance Dl from the first portion 110 to the connector 150 is longer than a distance from the first portion 110 to at least one light transmissive portion 131 of the outer surface. In other words, the connector 150 is arranged at an upper part/portion of the lighting device 100 at which light may exit the lighting device 100, rather than at a lower part/portion (or base) of the lighting device 100 where no light may exit the lighting device 100.

In the present embodiment, a light transmissive portion 131 of the outer surface is arranged in direct contact with the first portion 110, so a distance D1 from the first portion 110 to the connector 150 is longer than a distance from the first portion 110 to at least one light transmissive portion 131 of the outer surface, regardless of where along the metal heat sink 140 the connector 150 is arranged.

The first portion 110 is exemplified herein by a base 110 with a cap 111 for mounting the lighting device 100 in a socket. The base 110 may comprise driver electronics (not shown in FIGS. 1 and 2) for the solid state light source 120. The base 110 may for example comprise an AC/DC converter. The lighting device 100 of the present embodiment is a retrofit lighting device 100 with a cap 111 for mounting the lighting device 100 in a standard socket, for example a E14, E27, B22d, Ba15d, G4 or GU10 socket. In other embodiments, the lighting device 100 may be adapted to receive direct current. The lighting device 100 may for example not comprise an AC/DC converter. An AC/DC converter may for example be arranged in a lamp or lighting arrangement in which multiple lighting devices 100 are mounted, such as in a chandelier.

In some embodiments, the first portion 110 may for example include a USB interface/contact for mounting the lighting device 100 at a USB contact, instead of in an E14 or E27 socket.

The second portion 130 is exemplified herein by a light guide 130. The metal heat sink 140 is exemplified by a metal strip 140 extending at least partly around the light guide 130 (in other words, the light guide 130 is at least partly surrounded by the metal strip 140) along a surface 132 of the light guide 130. The metal strip 140 is arranged in thermal contact with the surface 132 of the light guide 130.

In the present example, the light guide 130 is a solid plate 130 having two main surfaces 131 and 133 and an edge 132 joining the two main surfaces 131 and 133. In the present example, the edge 132 is the surface 132 along which the metal strip 140 is arranged, and the edge 132 is normal to a plane 170 along which the light guide 130 extends. In other words, the edge 132 is parallel to a normal vector 180 of the plane 170. The light guide 130 is flat in the sense that it extends at least four times more in a direction along the plane 170 than along a normal 180 to the plane. In other words, the light guide 130 extends a distance dl along the plane 170, but only a distance d2 along a direction 180 which is normal (or perpendicular to) the plane 170, where d1≥4×d2. The distance d2 covered by the light guide 130 along a direction 180 normal to the plane 170 may be regarded as a thickness of the light guide 130. The distance d1 covered by the light guide 130 along the plane 140 may be regarded as a length or height of the light guide 130.

The light guide 130 may for example have a thickness of 8-12 mm.

The light guide 130 is transparent or translucent so that light may propagate therein. The light guide 130 comprises thermally conductive material so that the light guide 130 may dissipate heat. The light guide 130 may for example be made of (solid) glass or polymer material such as polymethyl methacrylate (PMMA) or polycarbonate (PC).

The light guide 130 may for example have light scattering outcoupling structures, e.g. in the form a surface structure/pattern on the main surfaces 131 and 133 for providing a more omnidirectional light output.

The metal strip 140 is exemplified herein by a flat metal band 140 (or flat sheet metal ribbon) folded around the edge 132 of the light guide 130 such that the metal strip 140 is normal to the plane 170 along which the light guide 130 extends.

The edge 132 of the light guide 130, along which the metal strip 140 extends, forms a strip along the outer surface of the light guide 130, the strip having light transmissive portions 131 and 133 of the outer surface on both sides. Light may therefore exit the lighting device 100 on both sides of the metal strip 140.

The metal strip 140 may for example be made of copper or aluminum.

The metal strip 140 may for example be manufactured by extrusion.

The metal strip 140 may for example be a die cast product.

The metal strip 140 may for example manufactured based on sheet metal.

The metal strip 140 may for example be as wide as the thickness d2 of the light guide 110.

The metal strip 140 may for example have a width which is less than the thickness d2 of the light guide 110 for allowing light to exit the light guide 130 also along the edge 132. By allowing light to exit the light guide 130 also along the edge 132, a more omnidirectional light output may be provided.

The metal strip 140 (or metal heat sink 140) may for example be perforated. Perforations of the metal strip 140 may be provided as openings or holes through the metal strip 140. Such perforations allow light to be emitted through the edge 132 of the light guide 130, which provides a more omnidirectional light output. As the light guide 130 contributes to the dissipation of heat to the environment (or ambient) of the lighting device 100, perforations may be provided in the metal strip 140 without a significant impact on the thermal performance of the lighting device 100.

Figure 8:
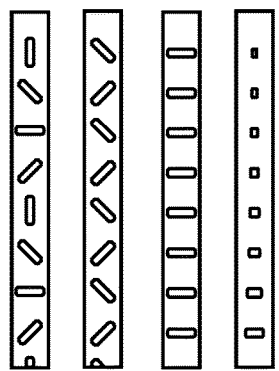
FIG. 8 shows example perforation patterns for a metal heat sink according to some embodiments.

FIG. 8 shows examples of perforation patterns for a metal heat sink (or a metal strip), according to some embodiments. Many other perforation patterns may also be envisaged. The metal strip 140 may for example have a thickness of 2-5 mm.

In the present example, the metal strip 140 extends all the way around the light guide 130. However, embodiments may be envisaged in which the metal strip 140 extends only partly around the light guide 130, such as at least half of a full revolution around the light guide 130, or at least two-third of a full revolution around the light guide 130.

A surface of metal strip 140 facing the light guide 130 may for example be reflective.

The solid state light source 120 (or semiconductor light source) is exemplified herein by light emitting diodes 120 (LEDs) arranged at a base of the lighting device 100, i.e. at an end of the second portion 130 at which the second portion 130 is mounted at the first portion 110. The LEDs 120 are arranged between the light guide 130 and the metal strip 140, and are arranged to face the edge 132 of the light guide 130. The LEDs 120 may for example be mounted at a printed circuit board (PCB).

In the present embodiment, the light guide 130 has a cavity 134 in which the LEDs 120 are arranged. The curved shape of the cavity 134 acts as an incoupling structure for coupling light emitted by the LEDs 120 into the light guide 130. Light from the LEDs 120 may be mixed in the light guide 130. A plurality of LEDs 120 may for example emit light of different colors, which may be mixed in the light guide 130 for providing a light mix (e.g., a white light mix).

The first portion 110 may for example comprise protruding side walls 112 (or side portions) which, when the lighting device 100 is assembled, prevent light from the LEDs 120 from escaping at the sides of the cavity 134 before reaching the light guide 130. The protruding side walls 112 may for example be reflective.

Embodiments may also be envisaged in which solid state light sources 120 are distributed along the edge 132 of the light guide instead of being arranged at the base of the light guide 130.

The connector 150 is exemplified herein by a protruding portion to which the electrical device 160 may be attached. Other examples of connectors 150 are holes (into which electrical devices 160 may be at least partly inserted), and snap fit designs.

The first portion 110 may for example include an electrical interface for connecting the lighting device to a power source. An electrical connection 190 may for example be arranged between the electrical interface of the first portion 110 and an electrical interface of the connector 150. The electrical connection 190 may for example be at least partly arranged between the metal strip 140 and the light guide 130. Hiding the electrical connection 190 between metal strip 140 and the light guide 130 may reduce its impact on the light output of the lighting device 100 and/or may prevent wear or unintentional physical interaction.

The electrical connection 190 may for example be provided in the form of a flex band cable, a flat band cable, a flex PCB, or other types of wiring.

The electrical device 160 is exemplified herein by a small electrical device 160 arranged on the outside of the metal heat sink 140. The electrical device 160 of the present embodiment is so small compared to the metal heat sink 140 that it is hidden behind the metal heat sink 140 and does not obstruct or shadow any light emitted by the solid state light sources 120.

By mounting the electrical device 160, via the connector 150, on the outside of the metal heat sink 140, the electrical device 160 has no impact on the light output of the lighting device 100. Hence, the functionality provided by the electrical device 160 may be added to the lighting device 100 without affecting the optical performance of the lighting device 100.

Figure 5:
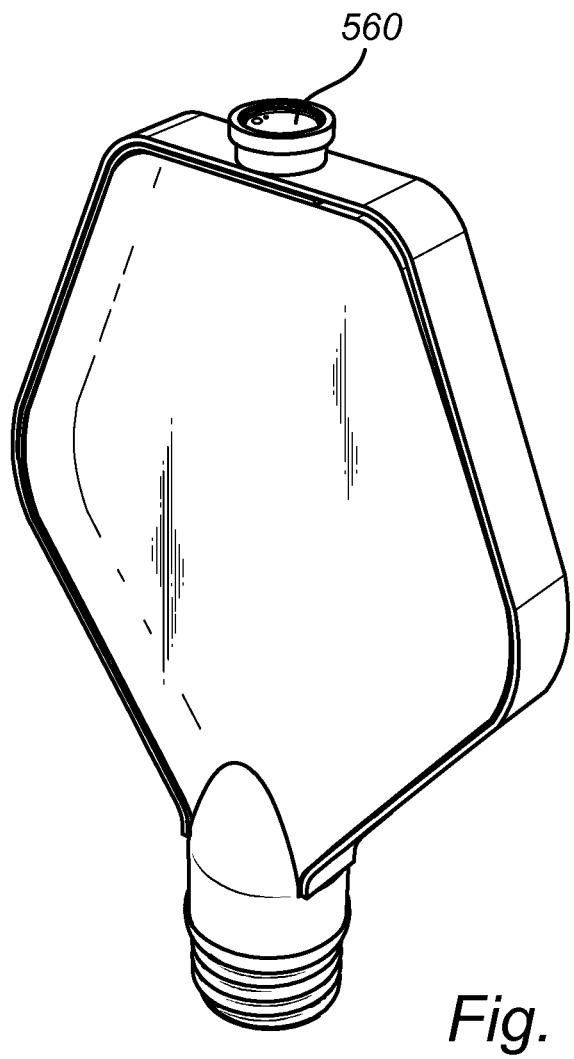
FIG. 5 shows a perspective view of the lighting device shown in FIG. 3, with a camera mounted at the connector, according to an embodiment.

The electrical device 160 may for example be a microphone, a camera, a presence detector, a smoke detector, an air quality sensor, or a loudspeaker. An example is illustrated in FIG. 5 where the electrical device is a camera 560.

Operation of the electrical device 160 may be based on interaction with the surroundings. Arranging the electrical device 160 at the outside of the lighting device 100 may facilitate interaction with the surroundings and may therefore improve operation of the electrical device 160. For example, the electrical device 160 may receive input from a room in which the lighting device 100 is mounted (e.g. if the electrical device 160 is a detector/sensor), and/or the electrical device 160 may provide output to a room in which the lighting device 100 is arranged (e.g. if the electrical device 160 is a loudspeaker).

In the lighting device 100, described with reference to FIGS. 1-2, the connector 150 and the electrical device 160 are arranged at an end of the second portion 130 located opposite to the first portion 110. Embodiments may also be envisaged in which the connector 150 and the electrical device 160 are arranged at other positions along the metal heat sink 140. Such an example is illustrated in FIG. 4, where an electrical device 460 is mounted at a position along the metal heat sink 440 between the first portion 410 and the end opposite the first portion 410 (or base). In the present example, a light transmissive portion 431 of the outer surface is arranged in direct contact with the first portion 410, so a distance D3 from the first portion 410 to the electrical device 450 (or to the connector) is longer than a distance from the first portion 410 to at least one light transmissive portion 431 of the outer surface, regardless of where along the metal heat sink 440 the electrical device 450 (or the connector) is arranged.

Figure 7:
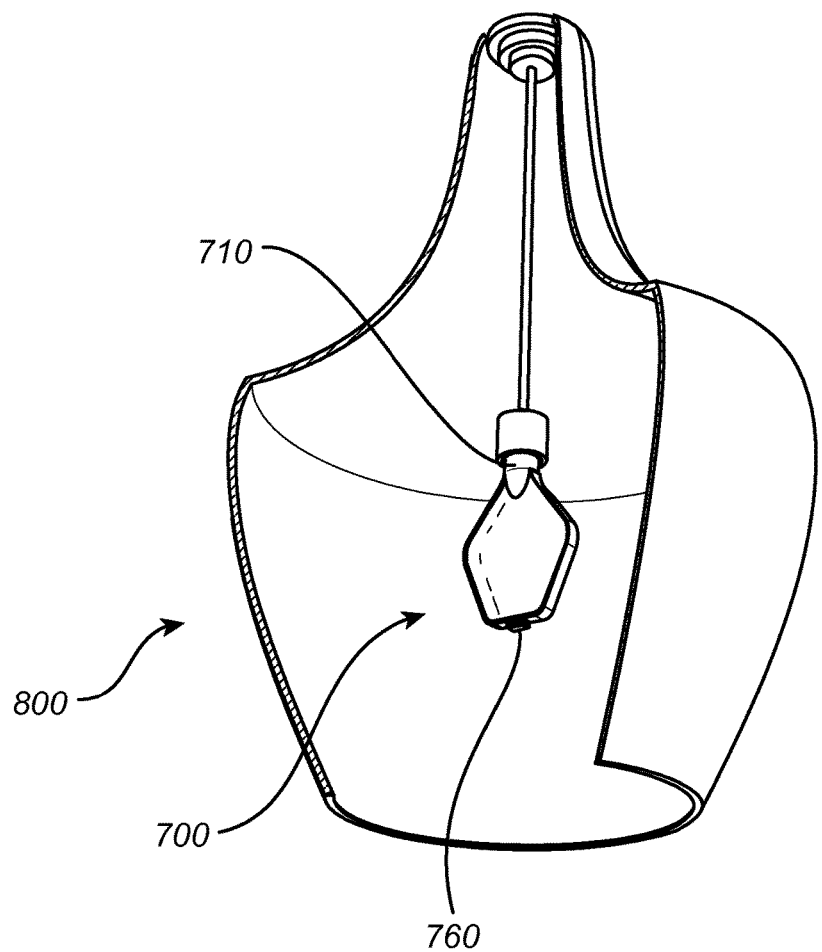
FIG. 7 shows a perspective view of a luminaire comprising the lighting device shown in FIG. 2, according to an embodiment.

As illustrated in FIG. 7, a lighting device 700 may for example be arranged in a luminaire 800 mounted in a ceiling of a room. Having the electrical device 760 mounted at an end opposite to the first portion 710 (or base) of the lighting device 700 may cause the electrical device 760 to be better positioned to interact with the surroundings of the luminaire 800. In particular, with the electrical device 760 mounted at an end opposite to the first portion 710 (or base), the light device 700 itself will not obstruct input to the electrical device 760 from the surroundings and/or output from the electrical device 760 to the surroundings.

In the lighting device 100, described with reference to FIG. 2, the electrical device 160 is mounted at the metal heat sink 140. The connector 150 and/or the electrical device 160 may for example be arranged so that the electrical device 160 is removably attached at the metal heat sink 140 (or is disconnectable/dismountable) so that the electrical device 160 may be removed and replaced if needed. The electrical device 160 may for example have a shorter lifetime than the other parts the lighting device 100, and it may be useful to be able to replace it when it breaks. Further, different types of electrical devices may for example be connectable/mountable at the connector 150 so as to provide the lighting device 100 with different functionalities. An electrical device mounted at the connector 150 may therefore be replaced by another type of electrical device when a different functionality is desired at the lighting device 100.

FIG. 3 shows the lighting device 100 in assembled form but without the electrical device 160. The lighting device 100 may for example be provided with a connector 150 for connecting an electrical device 160, and the electrical device 160 may be provided separately. The electrical device 160 may for example be connected/mounted at the connector 150 when needed.

Domotica is the integration of technology and services to improve the quality of people's life. The additional functionality provided by the electrical device 160 to the lighting device 100 allows the electrical device 100 to serve as a platform function for Home Domotica. Thereby, the already existing good infrastructure for lighting of homes may be employed. The infrastructure for lighting of homes may include presence of lighting devices in all rooms and connection to the mains power.

The electrical device 160 may for example be connected to a power supply via the lighting device 100, as exemplified by the electrical connection 190 described with reference to FIG. 1. Alternatively, or additionally, the electrical device 160 may comprise a local power supply in the form of a battery, so as not to be dependent on a connection to the mains power.

A connection to the mains power also allows for wired communication. The lighting device 100 may for example comprise a conversion unit (or sensor bridge) for converting signals between a signal format employed by the electrical device 160 and a signal format transmittable over a power line (e.g. the mains power) to which the first portion 110 is connectable.

The electrical device 160 may for example communicate via the power line to electrical devices mounted on other lighting devices and/or electrical devices arranged elsewhere.

The lighting device 100 may for example comprise a control unit arranged to control the solid state light source 120 based on input from the electrical device 160, The electrical device 160 (or add-on device 160) may for example extend the functionality of the lighting device 100 on a local level, i.e. it may for example perform presence detection in an area close to the lighting device 100 and/or control color and/or intensity of the light output of the lighting device 100.

The electrical device 160 (or add-on device 160) may for example extend the functionality of the lighting device 160 on a system level, i.e. the lighting device 100 may be connected to and interact with other lighting devices as part of building management, cloud management and service management.

The lighting devices described with reference to FIGS. 1-5 and 7 all comprise a light guide at least partly surrounded by a metal strip. Embodiments may also be envisaged in which a lighting device comprises a bulb (or envelope) instead of a light guide, and in which the solid state light source is be arranged within/inside the bulb (or envelope) instead of along an outside of the light guide. An example of such a lighting device is shown in FIG. 6.

Figure 6:
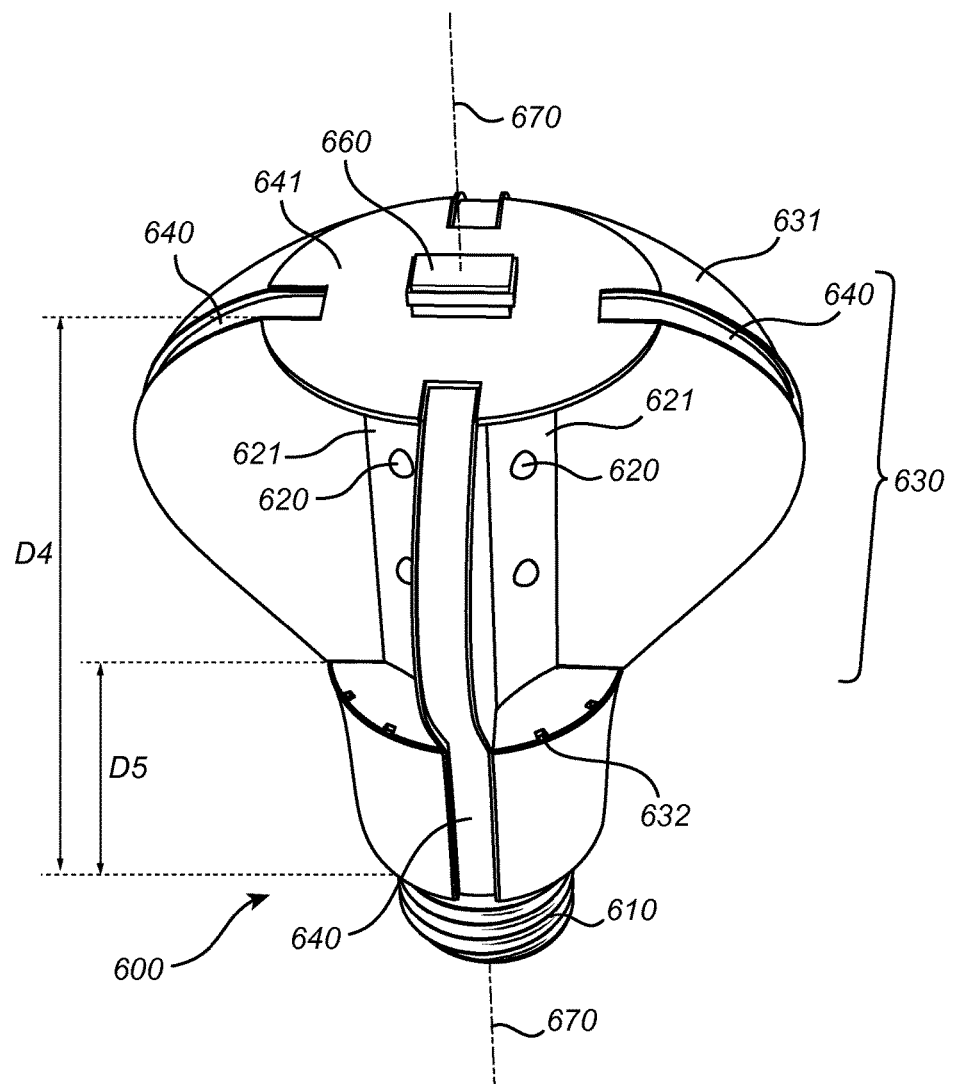
FIG. 6 shows a perspective view of a lighting device with a bulb according to an embodiment.

FIG. 6 shows a perspective view of a lighting device 600, according to an embodiment. The lighting device 600 comprises a first portion 610 (or base 610), a solid state light source 620, a second portion 630, a metal heat sink 640-641 and a connector (not shown in FIG. 6). The first portion 610 is arranged to electrically connect the lighting device 600. The second portion 630 is mounted on the first portion 610. The second portion 630 has an outer surface. A portion 631 of the outer surface is light transmissive for outputting light originating from the solid state light source 620. The metal heat sink 640-641 extends along the outer surface. The metal heat sink 640-641 is arranged in thermal contact with the solid state light source 620. The connector is arranged at the metal heat sink 640-641 for connecting an electrical device 660. A distance D4 from the first portion 610 to the connector (or to the electrical device 660 mounted at the connector) is longer than a distance D5 from the first portion 610 to at least one light transmissive portion 631 of the outer surface. In other words, the connector and the electrical device 660 are arranged at an upper part/portion of the lighting device 600 at which light may exit the lighting device 600, rather than at a lower part/portion (or base) of the lighting device 600 where no light may exit the lighting device 600.

The distances D4 and D5 may for example be measured in a direction along an axis 670 extending through a center of the lighting device 600, from a central end of the first portion 610 to a central end of the second portion 630 located opposite to an end of the second portion 630 at which the second portion 630 is mounted at the first portion 610.

In contrast to the lighting device 100, described with reference to FIGS. 1-2, the second portion 630 of the lighting device 600 is a bulb 630 (or envelope) and the solid state light source 620 is arranged inside the bulb 630 in a cavity.

In the present embodiment, the metal heat sink 640-641 comprises side portions 640 which extend from inside the bulb 630 into the outer surface of the bulb 630. The side portions 640 of the metal heat sink are exemplified herein by metal plates 640 extending from inside the bulb 630 and which also form part of the outer surface of the bulb 630. In the present embodiment, the metal heat sink 640-641 also comprises a top portion 641 at which the connector (hidden behind the electrical device 660 and not shown in FIG. 6) and the electrical device 660 are arranged. Light transmissible portions 631 and the metal heat sink 640-641 together form the outer surface of the bulb 630.

Each side portion 641 of the metal heat sink 640-641 extends along a strip of the outer surface of the bulb 630, and portions 631 on both sides of the strip are light transmissive. Light may therefore exit the lighting device 600 on both sides of each side portion 641 of the metal heat sink 640-641.

The solid state light sources 620 are exemplified herein by a cluster of LEDs 620 which is distributed into subgroups of LEDs 620 by the side portions 640 of the metal heat sink 640-641. The LEDs 620 are arranged on PCBs 621.

The outer surface of the bulb 630 includes four light transmissible portions 631 formed by releasably fixed light transmissible parts 631, of which two are left out in FIG. 6. The light transmissible parts 631 are provided with click/snap fit elements for enabling easy assembly onto the lighting device 600 by interconnecting with clicking elements 632.

An electrical connection from an electrical interface of the first portion 610 to the electrical device 660 may be arranged through a center of the lighting device 600 behind the PCBs 621.

Embodiments may also be envisaged in which a connector and an electrical device are mounted at one or more of the side portions 640 of the metal heat sink 640-641 instead of at the top portion 641, as long as a distance from the first portion 610 to the connector (or to the electrical device) is longer than a distance D5 from the first portion 610 to a light transmissible portion 631 of the outer surface of the bulb 630.

Embodiments may also be envisaged in which the metal heat sink 640-641 is formed only along the outer surface of the bulb 630, instead of extending inside the bulb 630.

Lighting devices having a metal heat sink extending along an outer surface of a second portion of the lighting device are described in WO2010/058325A1 with reference to FIGS. 2A-D, 3A-B, and 4-8 therein. A connector for mounting an electrical device may for example be arranged at (an outer surface of) one or more of these metal heat sinks to provide further embodiments of lighting devices in accordance with the present disclosure.

Although the lighting devices described above may comprise a plurality of solid state light sources, embodiments may also be envisaged in which a lighting device comprises only a single solid state light source (or LED), instead of a plurality of light sources.

Although the light guides described with reference to FIGS. 1-5 and 7 all have similar shapes, other shapes may also be envisaged for these light guides. For example, the light guide 130, described with reference to FIGS. 1-2, may in general have more or less any shape along the plane 170, but may have a limited thickness (e.g., measured along a normal to the plane 170). However, a particular desired optical light output may impose restrictions of the shape of the light guide 130, such as having a convex (or semi-convex) cross-section along the plane 170. The light guide 130 may for example have a circular or elliptic cross-section along the plane 170.

It will be appreciated that multiple connectors may be arranged along a metal heat sink of a lighting device for connecting multiple electrical devices.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising:
   a solid state light source;
   a first portion adapted to receive a direct or alternating current power source;
   a second portion mounted on the first portion, the second portion having an outer surface, wherein at least a portion of the outer surface of the second portion is light transmissive for outputting light originating from the solid state light source;
   a metal heat sink extending at least partly along the outer surface of the second portion, the metal heat sink arranged to be in thermal contact with the solid state light source; and
   a connector arranged at a position on the metal heat sink for connecting an electrical device from outside of the lighting device, the position on the metal heat sink being on a part of the metal heat sink that extends along the outer surface of the second portion;
   wherein a distance from the first portion to the connector is longer than a distance from the first portion to at least one light transmissive portion of the outer surface of the second portion.

2. The lighting device of claim 1, wherein the outer surface of the second portion comprises a strip and at least one main portion, the metal heat sink extending along the strip of the outer surface of the second portion, and the at least one main portion is light transmissive.

3. The lighting device of claim 1, wherein the connector is arranged at an end of the second portion located opposite to an end of the second portion at which the second portion is mounted on the first portion.

4. The lighting device of claim 1, further comprising the electrical device connected to the connector.

5. The lighting device of claim 1, wherein the electrical device comprises a sensor.

6. The lighting device of claim 1, wherein the second portion of the lighting device comprises a light guide and the metal heat sink comprises a metal strip extending at least partly around the light guide along a surface of the light guide, the metal strip being arranged in thermal contact with the surface of the light guide, wherein the solid state light source is arranged to emit light into the light guide, and wherein the connector is arranged at a position on the metal strip.

7. The lighting device of claim 6, wherein the light guide extends at least four times more in a direction along a plane in which the light guide extends than along a normal to the plane.

8. The lighting device of claim 6, wherein the solid state light source is arranged between the light guide and the metal strip.

9. The lighting device of claim 1, wherein the second portion is a bulb, and wherein the solid state light source is arranged inside the bulb.

10. The lighting device of claim 9, wherein the metal heat sink extends from inside the bulb to the outer surface of the second portion.

11. The lighting device of claim 9, further comprising a cluster of solid state light sources which is distributed in subgroups of solid state light sources by the metal heat sink.

12. The lighting device of claim 1, wherein the portion of the outer surface of the second portion that is light transmissive is arranged in direct contact with the first portion.

13. The lighting device of claim 1, wherein the first portion comprises a cap for mounting the lighting device in a socket or a USB contact, the socket being one of a E14, E27, B22d, Ba15d, G4, GU10 socket.

14. The lighting device of claim 1, wherein the first portion comprises protruding side walls for preventing light from the solid state light source from escaping the lighting device before reaching the second portion.

15. The lighting device of claim 1, wherein the solid state light source is arranged at a base of the second portion at which the second portion is mounted on the first portion.

16. The lighting device of claim 5, wherein the sensor comprises a microphone, camera, presence detector, smoke detector, or an air quality sensor.

17. The lighting device of claim 1, wherein the connector allows for the electrical device to be removably attached.

18. The lighting device of claim 1, further comprising an electrical connection between the first portion and an electrical interface of the connector.

19. The lighting device of claim 18, wherein the electrical connection includes a connection to provide power to the electrical device from the first portion.

20. The lighting device of claim 18, wherein the first portion includes a control unit to control the solid state light source based on input from the electrical device.

* * * * *